United States Patent
Li et al.

(10) Patent No.: US 9,640,969 B2
(45) Date of Patent: May 2, 2017

(54) ARC FAULT CIRCUIT INTERRUPTER

(71) Applicant: Chengli LI, Suzhou (CN)

(72) Inventors: Chengli Li, Suzhou (CN); Xiaoming Zhang, Suzhou (CN)

(73) Assignee: Chengli LI, Suzhou (CN)

( * ) Notice: Subject to any disclaimer, the term of this patent is extended or adjusted under 35 U.S.C. 154(b) by 71 days.

(21) Appl. No.: 14/310,223

(22) Filed: Jun. 20, 2014

(65) Prior Publication Data

US 2015/0116872 A1    Apr. 30, 2015

(30) Foreign Application Priority Data

Oct. 30, 2013    (CN) .......................... 201310533085.5

(51) Int. Cl.
| | | |
|---|---|---|
| *H02H 1/00* | (2006.01) | |
| *H01R 13/713* | (2006.01) | |
| *H01R 103/00* | (2006.01) | |
| *H01R 24/22* | (2011.01) | |

(52) U.S. Cl.
CPC ......... *H02H 1/0015* (2013.01); *H01R 13/713* (2013.01); *H01R 24/22* (2013.01); *H01R 2103/00* (2013.01)

(58) Field of Classification Search
CPC ...... H02H 9/04; H02H 3/0015; H01R 13/713; H01R 2103/00
USPC .................................................. 361/42, 2–7
See application file for complete search history.

(56) References Cited

U.S. PATENT DOCUMENTS 7,414,499 B2 *   8/2008   Germain ................ H01H 83/04
                                                                   335/18

FOREIGN PATENT DOCUMENTS

CN          101958212 A       1/2011

OTHER PUBLICATIONS

Chinese Office Action, dated Mar. 24, 2016, in a counterpart Chinese patent application, No. CN 201310533085.5.

* cited by examiner

*Primary Examiner* — Dharti Patel
(74) *Attorney, Agent, or Firm* — Chen Yoshimura LLP

(57) ABSTRACT

An arc fault circuit interrupter includes: an insulating casing, electrical input terminals and electrical output terminals, first and second electrical path connected between the electrical input terminals and electrical output terminals, and a movement mechanism. The movement mechanism includes: first and second moving contact arms, electrically coupled to the first and second electrical paths, respectively; a control circuit board; an arc detection mechanism, electrically coupled to the control circuit board, for detecting an arc signal and causing the control circuit board to generate a trip signal; a tripping mechanism, electrically coupled to the control circuit board, for receiving the trip signal to disconnect the electrical coupling between the first moving contact arm and the first electrical path and/or the electrical coupling between the second moving contact arm and the second electrical path. The device can immediately cut off the power when detecting an arc signal to prevent fire hazard.

11 Claims, 6 Drawing Sheets

ARC FAULT CIRCUIT INTERRUPTER

BACKGROUND OF THE INVENTION

Field of the Invention

This invention relates to an arc fault circuit interrupter (AFCI), and in particular and an AFCI for a plug of an electrical appliance.

Description of the Related Art

With economic development and the steady increase of standard of living, electrical appliances are widely used in households. They bring convenience but also potential safely hazard. In particular, with long periods of use of the electrical appliances, the power cords age, and arcs may occur between the lines and between a line and ground. This can cause fire which causes great damages. A product is needed that can detect arcs and cut off the power to prevent fire.

SUMMARY OF THE INVENTION

Accordingly, the present invention provides an arc fault circuit interrupter, which includes: an insulating casing; electrical input terminals extending into the casing and electrical output terminals extending out of the casing, and a first electrical path and a second electrical path formed between the electrical input terminals and electrical output terminals; and a movement mechanism disposed in the insulating casing, including: first and second moving contact arms, wherein the first moving contact arm is electrically coupled to the first electrical path, and the second moving contact arm is electrically coupled to the second electrical path; a control circuit board; an arc detection mechanism, electrically coupled to the control circuit board, for detecting an arc signal and causing the control circuit board to generate a trip signal; and a tripping mechanism, electrically coupled to the control circuit board, for receiving the trip signal from the control circuit board to disconnect the electrical coupling between the first moving contact arm and the first electrical path and/or the electrical coupling between the second moving contact arm and the second electrical path.

Optionally, the first electrical path is a phase path and the second electrical path is a neutral path. Optionally, both the first and second electrical paths are phase paths.

In a first embodiment, the arc detection mechanism includes at least a magnetic ring formed of a core and a coil wound on the core, wherein the magnetic ring surrounds at least a part of the first moving contact arm.

In a second embodiment, the arc detection mechanism includes at least a first magnetic ring and a second magnetic ring, each formed of a core and a coil wound on the core, wherein the first magnetic ring surrounds at least a part of the first moving contact arm and the second magnetic ring surrounds at least a part of the second moving contact arm.

In the first embodiment, the tripping mechanism includes: a bobbin having a coil; a core disposed inside the bobbin and being biased in a first direction away from the bobbin by a first spring force; an actuation connector, connected to an end of the core that is farther away from the bobbin; a tripping member releasably coupled to the actuation connector, which carries the first moving contact arm and the second moving contact arm to move in a second direction substantially perpendicular to the first direction under a second spring force; wherein when the magnetic ring detects no arc signal, the core is not driven by the bobbin, the actuation connector is engaged with the tripping member, and the first moving contact arm and the second moving contact arm are respectively electrically coupled to the first electrical path and the second electrical path; wherein when the magnetic ring detects an arc signal, the core is driven by the bobbin, the actuation connector moves toward the bobbin and disengages from the tripping member, and the first moving contact arm and the second moving contact arm move with the tripping member to respectively disconnect electrically from the first electrical path and the second electrical path.

Specifically, the tripping member includes a main body and two lifting arms that extend horizontally and outwardly from the main body, wherein the main body has a vertical through hole and a flat horizontal through hole connected with the vertical through hole for coupling with the actuation connector, wherein the two lifting arms are respectively disposed near and directly below the first moving contact arm and the second moving contact arm; wherein the arc fault circuit interrupter further includes a reset button, including a shaft which is disposed in the vertical through hole of the main body of the tripping member and supported by a reset spring which provides a spring force, wherein the shaft has a horizontal slot; wherein when the reset button is pressed down, the reset spring is compressed, the horizontal slot on the shaft of the reset button is engaged with the actuation connector; wherein when the reset button is released, the reset button is biased by the reset spring and brings the tripping member to move upwards, wherein the two lifting arms of the tripping member lift the first moving contact arm and the second moving contact arm with it until the first moving contact arm and the second moving contact arm are respectively electrically coupled to the first electrical path and the second electrical path.

Preferably, according to one aspect, the movement mechanism further includes an electrically insulating mounting frame and output wiring blocks respectively electrically coupled to the output terminals, wherein the mounting frame supports the control circuit board, and wherein the output wiring blocks are affixed on the control circuit board and are separated from the mounting frame to form a mounting area. Specifically, the arc detection mechanism includes a varistor and a capacitor connected in parallel between the first electrical path and the second electrical path, wherein the varistor prevents lightning surge and the capacitor removes wave interference of a sinusoidal AC current. More specifically, the varistor and the capacitor are arranged in the mounting area. Preferably, the capacitor is a high voltage ceramic capacitor. Preferably, the mounting frame has two opposing sidewalls and two protruding ears extend from the two opposing sidewalls respectively, wherein the first moving contact arm and the second moving contact arm are affixed to the respective protruding ears at respective locations of each moving contact arm between its two ends; wherein the varistor and the capacitor are arranged between the first moving contact arm and the second moving contact arm.

Using the above described tripping mechanism, the movement mechanism further includes an electrically insulating mounting frame and output wiring blocks respectively electrically coupled to the output terminals, wherein the mounting frame supports the control circuit board, and wherein the output wiring blocks are affixed on the control circuit board and are separated from the mounting frame to form a mounting area. Specifically, the mounting frame forms a first compartment located near the mounting area for accommodating the bobbin and a second compartment located farther away from the mounting area for accommodating the tripping member. More specifically, the arc detection mechanism includes a varistor and a capacitor connected in parallel between the first electrical path and the second electrical path, wherein the varistor prevents lightning surge and the capacitor removes wave interference of a sinusoidal AC current. Preferably, the varistor and the capacitor are arranged in the mounting area. Preferably, the capacitor is a high voltage capacitor. Preferably, the mounting frame has two opposing sidewalls and two protruding ears extend from the two opposing sidewalls respectively, wherein the first moving contact arm and the second moving contact arm are affixed to the respective protruding ears at respective locations of each moving contact arm between its two ends; wherein the varistor and the capacitor are arranged between the first moving contact arm and the second moving contact arm.

According to this invention, when arcs occur due to leakage between the lines of the power supply or between a line and the ground, the AFCI device can timely detect the arc signal and immediately cut off the power, preventing fire due to arc induced combustion.

BRIEF DESCRIPTION OF THE DRAWINGS

FIG. 4b is a cross-sectional view on a different plane than in FIG. 4a;

FIG. 5b is a cross-sectional view on a different plane than in FIG. 5a.

DETAILED DESCRIPTION OF THE PREFERRED EMBODIMENTS

Figure 1:
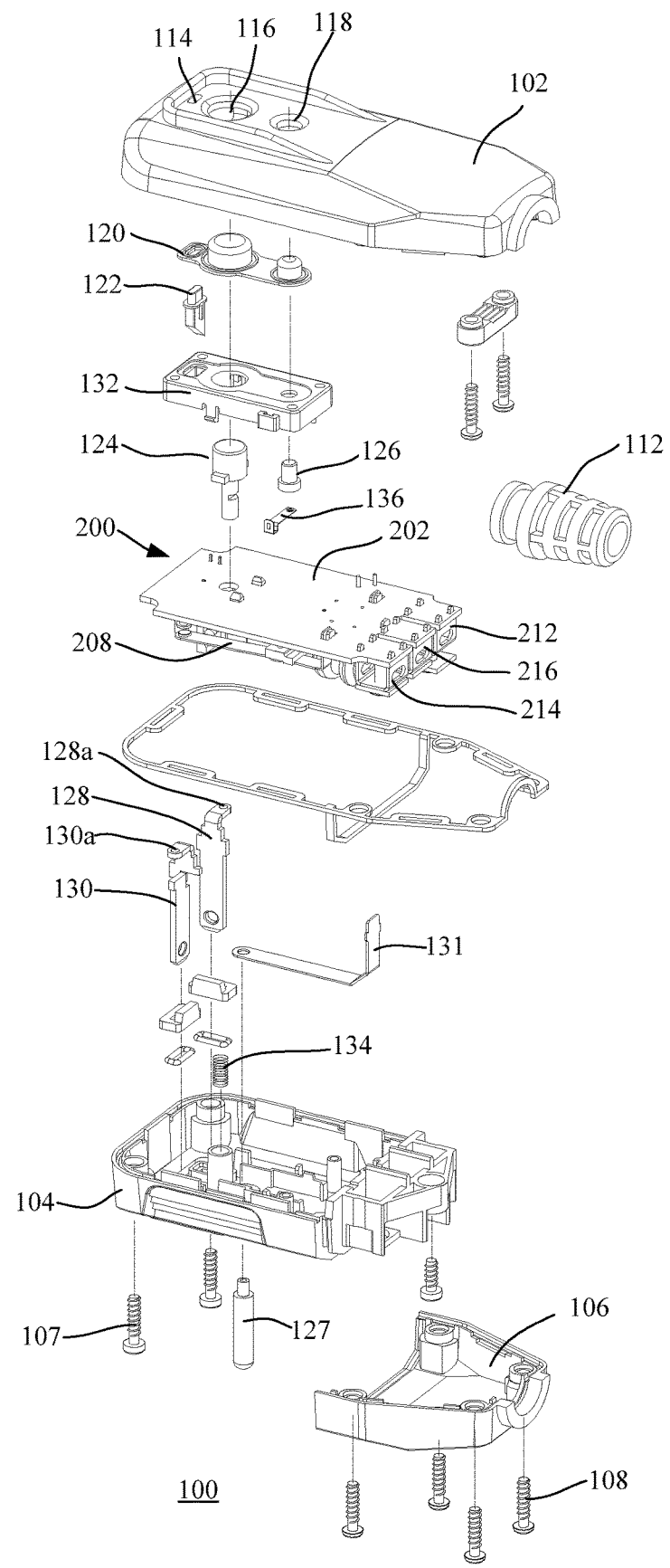
FIG. 1 is an exploded perspective view of an arc fault circuit interrupter (AFCI) according to an embodiment of the present invention.

In the detailed description below, reference is made to the drawings. The drawings show specific embodiments of the present invention, but do not limit other possible embodiments of the invention. It should be understood that other embodiments are possible, and structural or logical modifications are possible within the scope of the present invention. In the drawings, terms that indicate directions, such as down, up, left or right are relative to the orientations of the drawings. The components described in the embodiments can be placed in different orientations and therefore the terms of directions are for illustrative purposes and are not limiting. The embodiments describe below are illustrative and do not limit the scope of the invention which are defined by the appended claims.

Figure 2:
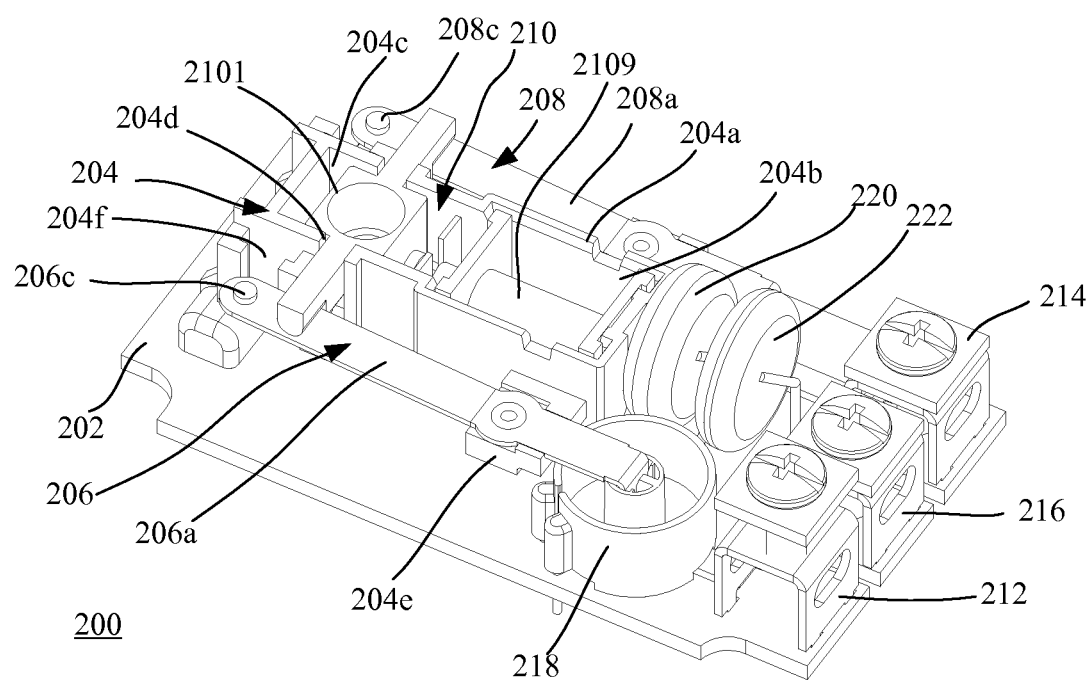
FIG. 2 is a perspective view of the movement mechanism of the AFCI of FIG. 1.
Figure 3:
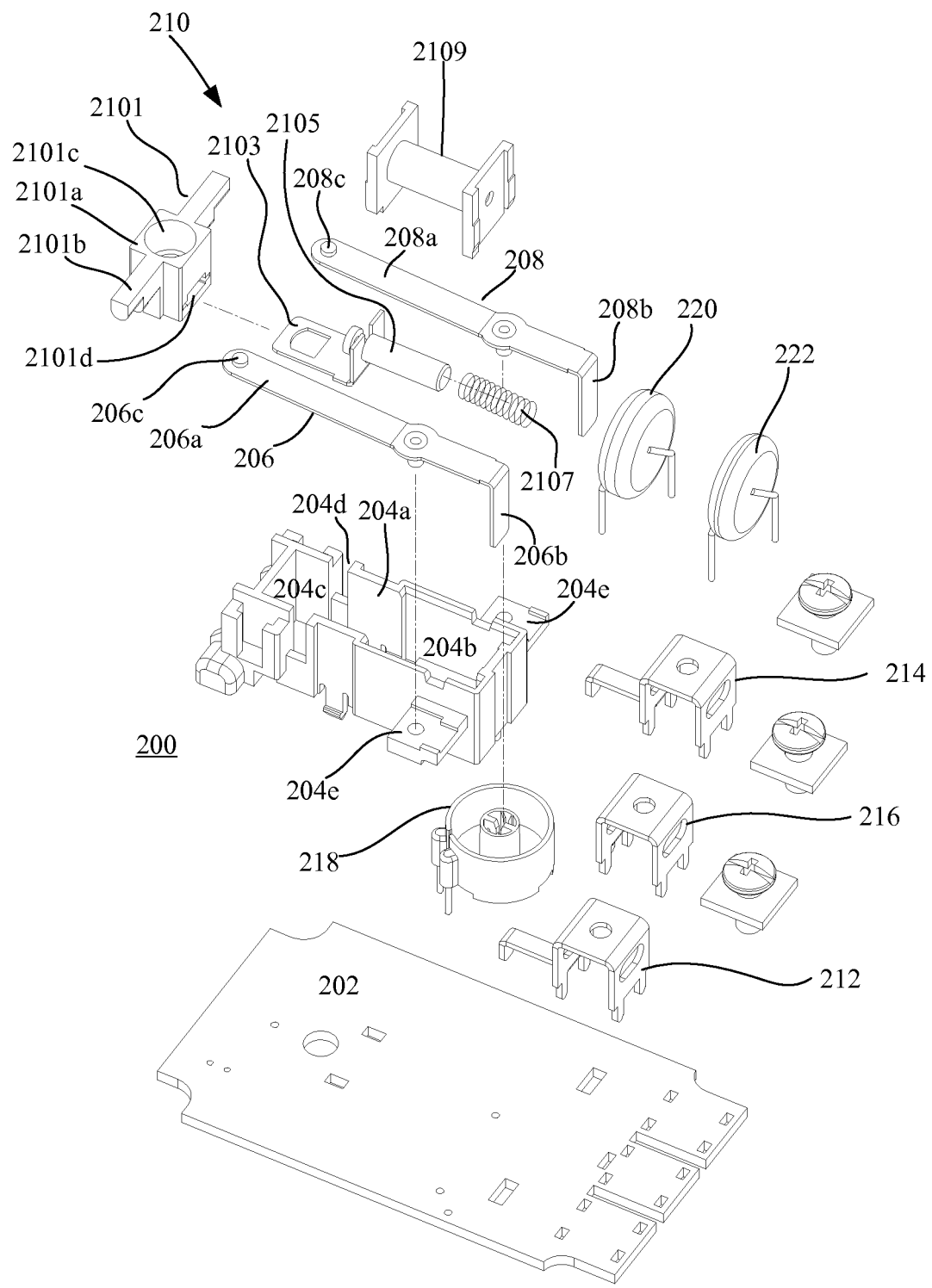
FIG. 3 is an exploded perspective view of the movement mechanism of FIG. 2.

FIG. 1 is an exploded perspective view of an arc fault circuit interrupter (AFCI) according to an embodiment of the present invention; FIG. 2 is a perspective view of the movement mechanism of the AFCI of FIG. 1; and FIG. 3 is an exploded perspective view of the movement mechanism of FIG. 2. Note that the orientation of FIGS. 2 and 3 is flipped upside-down as compared to the orientation shown in FIG. 1.

As shown in FIGS. 1-2, the insulating casing of the AFCI 100 is formed by an upper cover 102, a lower base 104 and a rear cover 106. The base 104 couples with the front portion of the upper cover 102, and is attached to the upper cover 102 by a number of screws 107. The rear cover 106 couples with a rear portion of the upper cover 102 and also couples with a rear end of the base 104, and is attached to the upper cover 102 by a number of screws 108. The upper cover 102 and the rear cover 106 respectively have a half-circle shaped opening on one of their ends, so that when the two openings are assembled together they form a round opening to accommodate a cable cladding 112. The cable cladding 112 is used to bound and hold the output electrical lines (not shown), which typically include an output phase line, an output neutral line and an output ground line. The upper cover 102 is provided with assembly holes 114, 116, 118 through it. A waterproof cap 120 forms protrusions corresponding to the assembly holes, including a protrusion for covering a power indicator light 122, a cylindrical shaped protrusion for covering a reset button 124, and a cylindrical shaped protrusion for covering a test button 126. Thus, when the waterproof cap 120 is assembled, the protrusions respectively protrude from the upper cover 102, so that the user can depress the reset button 124 and test button 126, and the power indicator light 122 can indicate to the user whether the device is energized. Those skilled in the art will understand that the waterproof cap 120 is optional.

The lower base 104 has two through holes for accommodating two insertion blades; a first metal blade 128 has one end that passes through one through hole to extend out of the base 104, and a second metal blade 130 has one end that passes through the other through hole to extend out of the base 104, for connecting to an input power source. The input ground pin 127 passes through the base 104 to enter the casing and is affixed to and electrically coupled to one end of a metal ground plate 131 inside the casing.

A movement mechanism 200 is disposed inside the casing of the circuit interrupter. Specifically, as shown in FIG. 3, the movement mechanism 200 includes a control circuit board 202, a mounting frame 204, a pair of moving contact arms 206, 208, a tripping mechanism 210, and output wiring blocks 212, 214 and 216 for respectively affixing the output phase line, output neutral line and output ground line of the output cable. The output wiring block 216 for the output ground line is affixed to and electrically coupled to another end of the metal ground plate 131. Specifically, the substantially vertically extending peripheral sidewalls 204a of the mounting frame 204 form a right compartment 204b and a left compartment 204c which are connected to each other. The tow opposing sidewalls forming the left compartment 204c have vertical slot openings 204d. On the right, on the two opposing sidewalls 204a, protruding ears 204e extend substantially horizontally and outwardly. On the left, on the outside of the tow opposing sidewalls 204a, vertical positioning slots 204f are formed.

The ends of the above-mentioned blades 128, 130 located within the casing are affixed in the positioning slots 204f of the mounting frame 204. The blades 128, 130 have respective contact terminals 128a, 130a.

The moving contact arms 206, 208 are formed of a resilient and electrically conductive metal (such as copper). Overall, they are L-shaped flat metal pieces. Specifically, the moving contact arm 206 includes a horizontal portion 206a and a vertical portion 206b; a contact terminal 206c is formed at the left end of the horizontal portion 206a. At a point on the right, the horizontal portion 206a is fastened to one of the protruding ears 204e with a rivet, so that the horizontal portion 206a forms a suspended arm. Similarly, the moving contact arm 208 includes a horizontal portion 208a and a vertical portion 208b; a contact terminal 208c is formed at the left end of the horizontal portion 208a. At a point on the right, the horizontal portion 208a is fastened to the other protruding ear 204e with a rivet, so that the horizontal portion 208a forms a suspended arm. In the orientation of FIG. 1, the pair of moving contact arms 206, 208 are mounted on the mounting frame 204 in the above-described manner, so that the contact terminals 206c, 208c of the moving contact arms 206, 208 are respectively located directly above the contact terminals 128a, 130a of the blades 128, 130.

The tripping mechanism 210 includes a tripping member 2101, a lock member 2103, core 2105, spring 2107 and bobbin 2109.

The tripping member 2101 includes a main body 2101a and two lifting arms 2101b that extend horizontally and outwardly from the main body 2101a. The main body 2101a is provided with a vertical through hole 2101c, and a flat horizontal through hole 2101d that connects with the vertical through hole 2101c. The main body 2101a of the tripping member 2101 is accommodated in the left compartment 204c of the mounting frame 204, and the two lifting arms 2101b are slidably disposed in the slot openings 204d. The lock member 2103 is substantially a sideways L shape, i.e., formed of a horizontal plate portion and a vertical plate portion. The horizontal plate portion is shaped to be inserted into the flat horizontal through hole 2101d of the tripping member 2101, and the vertical plate portion is engaged with one end of the core 2105. The other end of the core 2105 is disposed against the spring 2107 inside the bobbin 2109, and the core 2105 is slidably disposed inside the bobbin 2109. The bobbin 2109 is accommodated in the right compartment 204b. As shown in the drawings, the bobbin 2109 is substantially H shaped, i.e., formed of two square shaped end walls on the left and right and a cylindrical wall between them for holding the coil. When the bobbin 2109 is disposed in the right compartment 204d, the left and right end walls abut against the inner surface of the right compartment 204b, so that its position is fixed.

The movement mechanism 200 further includes a magnetic ring 208, a varistor 220 and a capacitor 222. Preferably, the capacitor 222 is a high voltage capacitor. More preferably, the capacitor is a high voltage ceramic capacitor. They are parts of the arc detector device. In a direction substantially parallel to the moving contact arms 206, 208 (i.e. the longitudinal direction), the varistor 220 and the capacitor 222 are arranged in an area of the control circuit board 202 between the mounting frame 204 and the output wiring blocks 212, 214 and 216. Further, in a direction substantially perpendicular to the moving contact arms 206, 208 (i.e. the transverse direction), the varistor 220 and the capacitor 222 are arranged between the moving contact arms 206, 208. At least a portion of the vertical portion 206b of the moving contact arms 206 is inserted into the center of the magnetic ring 218. The magnetic ring 218 has two wiring terminals, which pass through holes of the control circuit board 202 to be coupled to an arc fault processor 203. Specifically, the arc fault processor 203 may be a microprogrammed control unit (MCU). The varistor 220 and capacitor 222 are connected in parallel, via their respective wiring terminals, between the output wiring blocks 212 and 216.

Referring back to FIG. 1, to securely affix the reset button 124 and test button 126, an inner cover 132 is disposed between the upper cover 102 and the control circuit board 202. The test button 126 has a cap at least partially covered by the waterproof cover 120, and a shaft extending vertically below the cap. The shaft is provided with a horizontal slot. The shaft passes through, from top to bottom, the inner cover 132 and the control circuit board 202 to enter the through hole 2101c of the tripping member 2101; its end abuts against a reset spring 134 which is situated in a seat in the base. The end of the test button 126 opposite to the waterproof cover 120 is electrically coupled to the electrical components of the control circuit board 202 via metal a plate 136, and can be used to test whether the device is operating normally via the simulation test switch 136 on the control circuit board 202.

Figure 6:
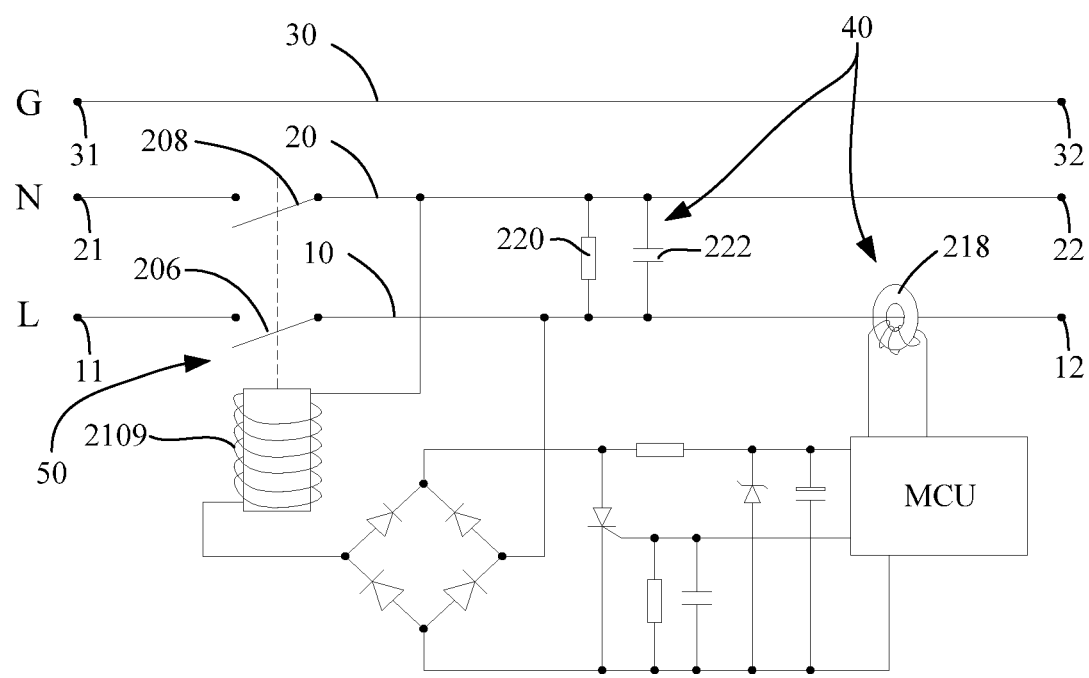
FIG. 6 is a circuit diagram of the detection circuit of the AFCI according to an embodiment of the present invention.

FIG. 6 is a circuit diagram of the detection circuit of the AFCI according to an embodiment of the present invention. The electrical connection of the various components of the AFCI 100 is described below with reference to this circuit diagram.

As shown in FIG. 6, the detection circuit includes a phase path 10, a neutral path 20, and a ground path 30, where the phase path 10 includes an input terminal 11 and an output terminal 12, the neutral path 20 includes an input terminal 21 and an output terminal 22, and the ground path 30 includes an input terminal 31 and an output terminal 32. Specifically, the input terminals 11, 21 are electrically coupled to the blades 128, 130 of the AFCI, and the output terminals 12, 22 and 32 can be coupled to the input and ground terminals of an electrical appliance (such as refrigerator, water heater, etc.). The detection circuit further includes a tripping sensing circuit 40 and a tripping actuating circuit 50. Specifically, the tripping sensing circuit 40 includes at least the above mentioned magnetic ring 218, AFCI processor 203, a filter module formed by the varistor 220 and capacitor 222, and a power source module formed by a rectifier bridge for supplying power. Those skilled in the relevant art will appreciate that the tripping sensing circuit 40 can additionally include other circuit modules, such as a voltage stabilizing module 42, a testing module 44 related to the above mentioned test button 126, which are not substantially related to the present invention and are not described in detail here. The magnetic ring 218 includes a core and a coil wound around the core; the core surrounds the vertical portion 206b of the first moving contact arm 206 that passes through it. The coil is used to sense the current flowing through the moving arm, and the two terminals of the coil are respectively coupled to the input pins of the arc fault processor 203 as input signal. The tripping actuating circuit 50 includes the above mentioned pair of moving contact arms 206, 208 and the tripping mechanism 210. The contact terminal 206c of the moving contact arm 206 corresponds to the phase path 10 and functions as a switch, and the contact terminal 208c of the moving contact arm 208 corresponds to the neutral path 20 and functions as a switch. The coil wound on the bobbin 2109 of the tripping mechanism 210 has two wiring terminals, one of which is electrically coupled to the neutral path 20, the other of which is electrically coupled to a node of the rectifier bridge, as shown in the figure. The phase path 10 is electrically coupled to another node of the rectifier bridge via wires. A silicon controlled rectifier (also called thyristor) 52 is electrically coupled to the other two nodes of the rectifier bridge.

Those skilled in the relevant art will understand that, for a power source that has two phase paths and a ground path, two magnetic rings can be provided, both electrically coupled to the arc fault processor 203; the cores of the two magnetic rings can respectively surround two moving contact arm which are electrically coupled to the phase paths, to sense the current flowing through the moving contact arms. For example, in one embodiment, which has two phase paths and a ground path, correspondingly, the movement mechanism include a pair of moving contact arms respectively electrically coupled to the two phase paths, and the arc detector device can be used to detect arc signals between one phase path and the ground path and/or between another phase path and the ground path and/or between the two phase paths, to cause the control circuit board to generate a tripping signal. The tripping mechanism receives the tripping signal from the control circuit board to disconnect one moving contact arm from one phase path and/or disconnect the other moving contact arm from the other phase path. And, the arc detection device should include a first magnetic ring and a second magnetic ring which respectively includes at least a core and a coil wound around the core. The first magnetic ring surrounds at least a part of the moving contract arm electrically coupled to one phase path, and the second magnetic ring surrounds at least a part of the moving contract arm electrically coupled to the other phase path.

Figure 4A:
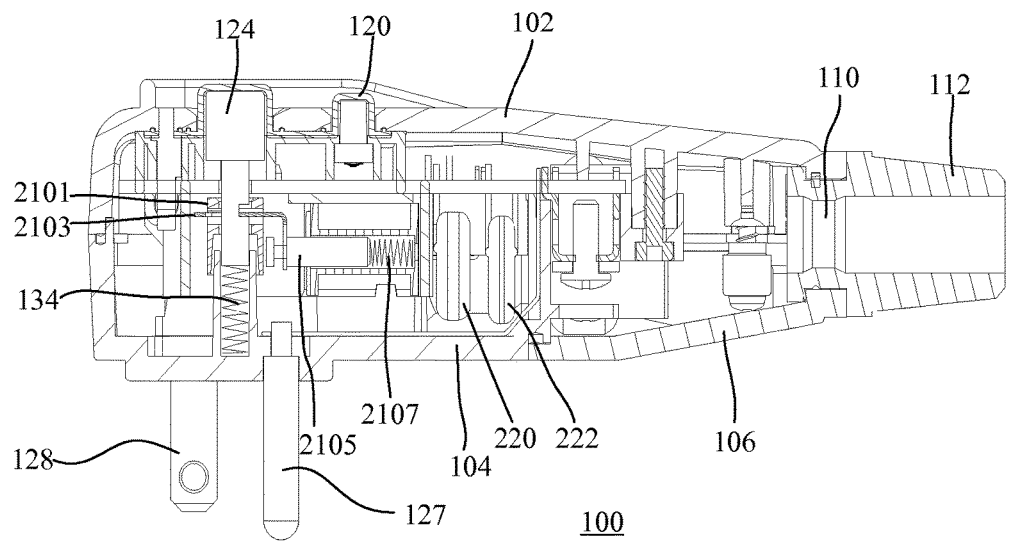
FIGS. 4a-4b are cross-sectional views of the AFCI in a reset state, where
Figure 4B:
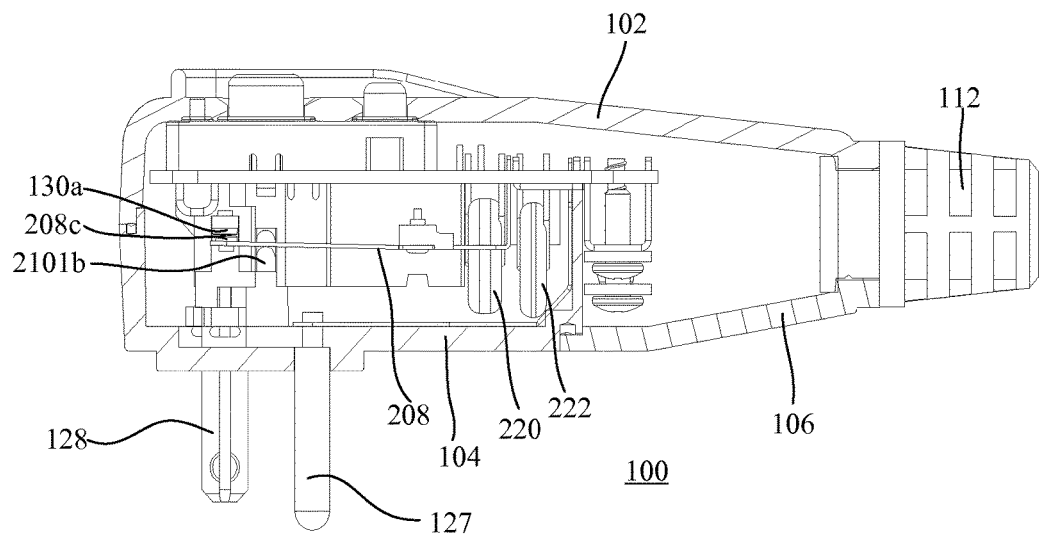
Figure 5A:
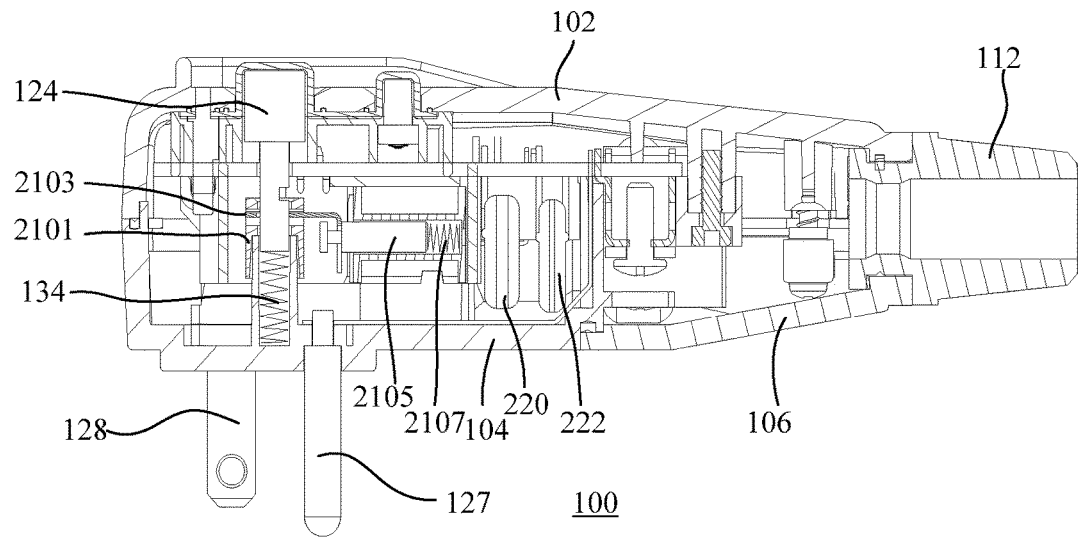
FIGS. 5a-5b are cross-sectional views of the AFCI in a tripped state, where
Figure 5B:
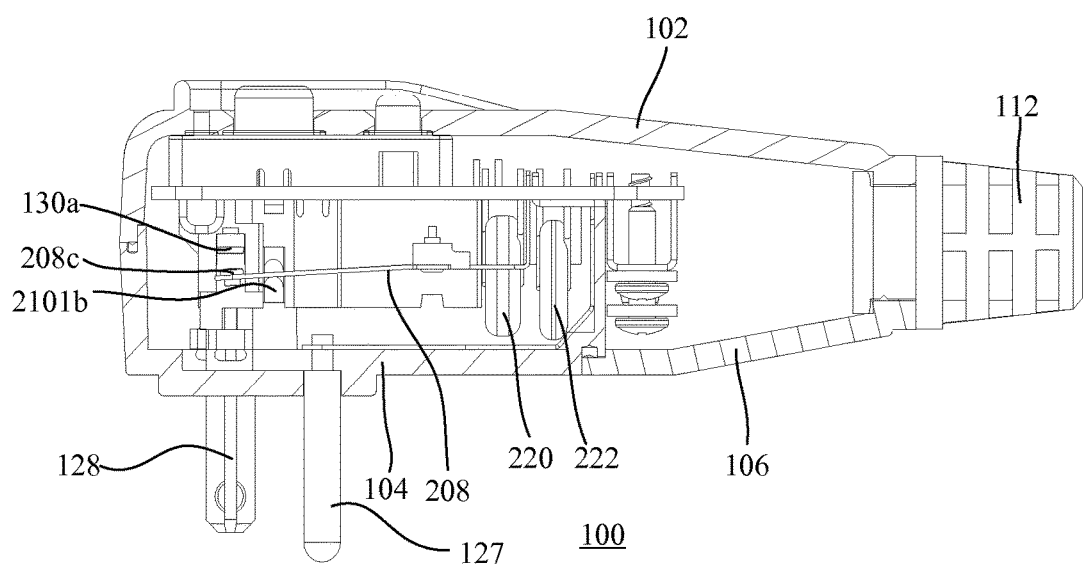

FIGS. 4a-4b are cross-sectional views of the AFCI in a reset state, where FIG. 4b is a cross-sectional view on a different plane than in FIG. 4a. FIGS. 5a-5b are cross-sectional views of the AFCI in a tripped state, where FIG. 5b is a cross-sectional view on a different plane than in FIG. 5a. The operation of the AFCI according to an embodiment of the present invention is explained with reference to FIGS. 4a-4b and 5a-5b.

When the user presses down the reset button 124, the reset spring 134 is compressed downward; during the downward movement of the shaft of the reset button 124, its horizontal slot comes into alignment with the horizontal portion of the lock member 2103 which is biased by the spring 2107. Thus, the horizontal portion of the lock member 2103 goes into the horizontal slot of the shaft of the reset button 124, and cannot get out of it due to the biasing action of the spring 2107. At this time, when the user releases the reset button 124, the reset button moves upwards under the biasing force of the reset spring 134. Due to the engagement of the lock member 2103 and the tripping member 2101, the reset button 124 brings the tripping member 2101 to move upwards. Thus, the two lifting arms 2101b of the tripping member 2101 lift the moving contact arms 206, 208, which are located above the two lifting arms, upwards until the contact terminals of the moving contact arms 206, 208 respectively electrically coupled to the corresponding phase path 10 and neutral path 20; thus, the switch is closed.

After the switch is closed, the AFCI 100 can conduct electricity from the input terminals 11, 21, 31 via the metal blades 128, 103 and metal ground plate 131 to the output wiring blocks 212, 214 and 216 which are electrically coupled to the output terminals 12, 22, 32, and then output the electricity to the external electrical appliance via the cable. The varistor 220 and the capacitor 222 of the filter module are respectively used to prevent lightning surge and to remove wave interference of the sinusoidal AC current. The magnetic ring 218 senses the current flowing through the moving contact arm 206 and apply the induced electrical voltage to the input pins of the arc fault processor 203.

When arcs occur between the phase path 10 and the ground path 30 or between the phase path 10 and the neutral path 20, by sensing the range of electrical current in the moving contact arm 206, the magnetic ring 218 applies an induced voltage of a certain range to the arc fault processor 203. The arc fault processor 203 outputs a specific signal to trigger the silicon controlled rectifier 52 to conduct; as a result, the coil of the bobbin 2109 generates a sufficiently large magnetic field to cause the core 2105 to compress the spring 2107 and move back into the inside of the bobbin 2109. Thus, the lock member 2103 disengages from the reset button 124 to release the linkage between the reset button 124 and the tripping member 2101. The tripping member 2101, due to its own weight and the resilient recovering force of the moving contact arms 206, 208, drops to its initial position. Accordingly, the contact terminals 206c, 208c of the moving contact arms 206, 208 separate from the respective contact terminals 128a, 130a of the blades 128, 130; thus, the switch is open.

Those skilled in the relevant art will understand that, for a power source that has two phase paths and a ground path, when arcs occur between two phase paths, between one phase path and a ground path, or between the other phase path and the ground path, the two magnetic rings can detect the arc signal and can separate the contact terminals of the moving contact arms and the blades to cut off the power.

The AFCI 100 of this invention can timely detect arc signal and can cut off the power in response, thereby preventing fire caused by arcs.

Those skilled in the art should understand that the above embodiments are illustrative and not limiting. Various technical features of various embodiments can be combined to achieve desired effects. Those skilled in the art can understand and implement other variations and embodiments based on the drawings, disclosures and claims of the instant application. In the claims, the term "include" does not exclude other elements or steps; the article "a" does not exclude plural; and terms "first", "second" etc. are only used to indicate the elements and do not imply any particular sequence. Any reference symbols used in the claims should not be understood to limit the scope of protection. The functions of multiple components in the claims may be achieved by a single hardware or software module. Technical features that appear in different dependent claims do not mean that these features cannot be combined to achieve beneficial results.

What is claimed is:

1. An arc fault circuit interrupter comprising:
   an insulating casing;
   electrical input terminals extending into the casing and electrical output terminals extending out of the casing, and a first electrical path and a second electrical path formed between the electrical input terminals and electrical output terminals; and
   a movement mechanism disposed in the insulating casing, including:
      first and second moving contact arms, wherein the first moving contact arm is electrically coupled to the first electrical path, and the second moving contact arm is electrically coupled to the second electrical path;
      a control circuit board;
      an arc detection mechanism, electrically coupled to the control circuit board, for detecting an arc signal and causing the control circuit board to generate a trip signal;
      a tripping mechanism, electrically coupled to the control circuit board, for receiving the trip signal from the control circuit board to disconnect the electrical coupling between the first moving contact arm and the first electrical path and/or the electrical coupling between the second moving contact arm and the second electrical path;
      an electrically insulating mounting frame supporting the control circuit board; and
      output wiring blocks respectively electrically coupled to the output terminals, affixed on the control circuit board and separated from the mounting frame, to define a mounting area between the mounting frame and the output wiring blocks;

wherein the arc detection mechanism includes a varistor and a capacitor connected in parallel between the first electrical path and the second electrical path, and wherein the varistor and the capacitor are disposed in the mounting area between the mounting frame and the output wiring blocks, wherein the first electrical path is a phase path and the second electrical path is a neutral path, and wherein the arc detection mechanism includes at least a magnetic ring formed of a core and a coil wound on the core, wherein the magnetic ring surrounds at least a part of the first moving contact arm.

2. An arc fault circuit interrupter comprising:

an insulating casing;

electrical input terminals extending into the casing and electrical output terminals extending out of the casing, and a first electrical path and a second electrical path formed between the electrical input terminals and electrical output terminals; and a movement mechanism disposed in the insulating casing, including:

first and second moving contact arms, wherein the first moving contact arm is electrically coupled to the first electrical path, and the second moving contact arm is electrically coupled to the second electrical path;

a control circuit board;

an arc detection mechanism, electrically coupled to the control circuit board, for detecting an arc signal and causing the control circuit board to generate a trip signal;

a tripping mechanism, electrically coupled to the control circuit board, for receiving the trip signal from the control circuit board to disconnect the electrical coupling between the first moving contact arm and the first electrical path and/or the electrical coupling between the second moving contact arm and the second electrical path;

an electrically insulating mounting frame supporting the control circuit board; and output wiring blocks respectively electrically coupled to the output terminals, affixed on the control circuit board and separated from the mounting frame, to define a mounting area between the mounting frame and the output wiring blocks;

wherein the arc detection mechanism includes a varistor and a capacitor connected in parallel between the first electrical path and the second electrical path, and wherein the varistor and the capacitor are disposed in the mounting area between the mounting frame and the output wiring blocks, wherein both the first and second electrical paths are phase paths, and wherein the arc detection mechanism includes at least a first magnetic ring and a second magnetic ring, each formed of a core and a coil wound on the core, wherein the first magnetic ring surrounds at least a part of the first moving contact arm and the second magnetic ring surrounds at least a part of the second moving contact arm.

3. The arc fault circuit interrupter of claim 1, wherein the tripping mechanism includes:

a bobbin having a coil;

a core disposed inside the bobbin and being biased in a first direction away from the bobbin by a first spring force;

an actuation connector, connected to an end of the core that is farther away from the bobbin;

a tripping member releasably coupled to the actuation connector, which carries the first moving contact arm and the second moving contact arm to move in a second direction substantially perpendicular to the first direction under a second spring force;

wherein when the magnetic ring detects no arc signal, the core is not driven by the bobbin, the actuation connector is engaged with the tripping member, and the first moving contact arm and the second moving contact arm are respectively electrically coupled to the first electrical path and the second electrical path; wherein when the magnetic ring detects an arc signal, the core is driven by the bobbin, the actuation connector moves toward the bobbin and disengages from the tripping member, and the first moving contact arm and the second moving contact arm move with the tripping member to respectively disconnect electrically from the first electrical path and the second electrical path.

4. The arc fault circuit interrupter of claim 3, wherein the tripping member includes a main body and two lifting arms that extend horizontally and outwardly from the main body, wherein the main body has a vertical through hole and a flat horizontal through hole connected with the vertical through hole for coupling with the actuation connector, wherein the two lifting arms are respectively disposed near and directly below the first moving contact arm and the second moving contact arm; wherein the arc fault circuit interrupter further comprises a reset button, including a shaft which is disposed in the vertical through hole of the main body of the tripping member and supported by a reset spring which provides a spring force, wherein the shaft has a horizontal slot;

wherein when the reset button is pressed down, the reset spring is compressed, the horizontal slot on the shaft of the reset button is engaged with the actuation connector; wherein when the reset button is released, the reset button is biased by the reset spring and brings the tripping member to move upwards, wherein the two lifting arms of the tripping member lift the first moving contact arm and the second moving contact arm with it until the first moving contact arm and the second moving contact arm are respectively electrically coupled to the first electrical path and the second electrical path.

5. The arc fault circuit interrupter of claim 3, wherein the mounting frame forms a first compartment located near the mounting area for accommodating the bobbin and a second compartment located farther away from the mounting area for accommodating the tripping member.

6. The arc fault circuit interrupter of claim 1, wherein the varistor prevents lightning surge and the capacitor removes wave interference of a sinusoidal AC current.

7. The arc fault circuit interrupter of claim 1, wherein the capacitor is a high voltage ceramic capacitor.

8. An arc fault circuit interrupter comprising:

an insulating casing;

electrical input terminals extending into the casing and electrical output terminals extending out of the casing, and a first electrical path and a second electrical path formed between the electrical input terminals and electrical output terminals; and a movement mechanism disposed in the insulating casing, including:

first and second moving contact arms, wherein the first moving contact arm is electrically coupled to the first electrical path, and the second moving contact arm is electrically coupled to the second electrical path;

a control circuit board;

an arc detection mechanism, electrically coupled to the control circuit board, for detecting an arc signal and causing the control circuit board to generate a trip signal;

a tripping mechanism, electrically coupled to the control circuit board, for receiving the trip signal from the control circuit board to disconnect the electrical coupling between the first moving contact arm and the first electrical path and/or the electrical coupling between the second moving contact arm and the second electrical path;

an electrically insulating mounting frame supporting the control circuit board; and output wiring blocks respectively electrically coupled to the output terminals, affixed on the control circuit board and separated from the mounting frame, to define a mounting area between the mounting frame and the output wiring blocks;

wherein the arc detection mechanism includes a varistor and a capacitor connected in parallel between the first electrical path and the second electrical path, and wherein the varistor and the capacitor are disposed in the mounting area between the mounting frame and the output wiring blocks, wherein the mounting frame has two opposing sidewalls and two protruding ears extend from the two opposing sidewalls respectively, wherein the first moving contact arm and the second moving contact arm are affixed to the respective protruding ears at respective locations of each moving contact arm between its two ends; wherein the varistor and the capacitor are arranged between the first moving contact arm and the second moving contact arm.

9. An arc fault circuit interrupter comprising:

an insulating casing;

first and second electrical input terminals extending out of the casing;

first and second output wiring blocks;

a first electrical path disposed inside the casing and electrically coupled between the first electrical input terminal and the first output wiring block, including a first moving contact arm;

a second electrical path disposed inside the casing and electrically coupled between the second electrical input terminal and the second output wiring block, including a second moving contact arm;

a control circuit board;

an arc detection mechanism for detecting an arc fault condition and generating an arc signal;

an arc fault processor mounted on the control circuit board, electrically coupled to the arc detection mechanism to generate a trip signal in response to the arc signal;

an electrically insulating mounting frame affixed to the control circuit board;

a tripping mechanism, supported by the mounting frame and electrically coupled to the arc fault processor, for disconnecting the electrical coupling between the first moving contact arm and the first electrical input terminal and/or the electrical coupling between the second moving contact arm and the second electrical input terminal in response to the trip signal;

wherein the first and second output wiring blocks are affixed on the control circuit board and separated from the mounting frame, to define a mounting area between the mounting frame and the output wiring blocks; and a varistor and a capacitor each electrically connected between the first electrical path and the second electrical path, wherein the varistor and the capacitor are disposed in the mounting area between the mounting frame and the output wiring blocks, wherein the first electrical path is a phase path and the second electrical path is a neutral path, wherein the arc detection mechanism includes a magnetic ring formed of a core and a coil wound on the core, wherein the magnetic ring surrounds at least a part of the first moving contact arm, and wherein the magnetic ring is disposed in the mounting area between the mounting frame and the output wiring blocks and adjacent to the varistor and the capacitor.

10. An arc fault circuit interrupter comprising:

an insulating casing;

first and second electrical input terminals extending out of the casing;

first and second output wiring blocks;

a first electrical path disposed inside the casing and electrically coupled between the first electrical input terminal and the first output wiring block, including a first moving contact arm;

a second electrical path disposed inside the casing and electrically coupled between the second electrical input terminal and the second output wiring block, including a second moving contact arm;

a control circuit board;

an arc detection mechanism for detecting an arc fault condition and generating an arc signal;

an arc fault processor mounted on the control circuit board, electrically coupled to the arc detection mechanism to generate a trip signal in response to the arc signal;

an electrically insulating mounting frame affixed to the control circuit board;

a tripping mechanism, supported by the mounting frame and electrically coupled to the arc fault processor, for disconnecting the electrical coupling between the first moving contact arm and the first electrical input terminal and/or the electrical coupling between the second moving contact arm and the second electrical input terminal in response to the trip signal;

wherein the first and second output wiring blocks are affixed on the control circuit board and separated from the mounting frame, to define a mounting area between the mounting frame and the output wiring blocks; and a varistor and a capacitor each electrically connected between the first electrical path and the second electrical path, wherein the varistor and the capacitor are disposed in the mounting area between the mounting frame and the output wiring blocks, wherein both the first and second electrical paths are phase paths, wherein the arc detection mechanism includes a first magnetic ring and a second magnetic ring, each formed of a core and a coil wound on the core, wherein the first magnetic ring surrounds a part of the first moving contact arm and the second magnetic ring surrounds a part of the second moving contact arm, and wherein the first and second magnetic rings are disposed in the mounting area between the mounting frame and the output wiring blocks and adjacent to the varistor and the capacitor.

11. An arc fault circuit interrupter comprising:

an insulating casing;

first and second electrical input terminals extending out of the casing;

first and second output wiring blocks;

a first electrical path disposed inside the casing and electrically coupled between the first electrical input terminal and the first output wiring block, including a first moving contact arm;

a second electrical path disposed inside the casing and electrically coupled between the second electrical input terminal and the second output wiring block, including a second moving contact arm;

a control circuit board;

an arc detection mechanism for detecting an arc fault condition and generating an arc signal;

an arc fault processor mounted on the control circuit board, electrically coupled to the arc detection mechanism to generate a trip signal in response to the arc signal;

an electrically insulating mounting frame affixed to the control circuit board;

a tripping mechanism, supported by the mounting frame and electrically coupled to the arc fault processor, for disconnecting the electrical coupling between the first moving contact arm and the first electrical input terminal and/or the electrical coupling between the second moving contact arm and the second electrical input terminal in response to the trip signal;

wherein the first and second output wiring blocks are affixed on the control circuit board and separated from the mounting frame, to define a mounting area between the mounting frame and the output wiring blocks; and a varistor and a capacitor each electrically connected between the first electrical path and the second electrical path, wherein the varistor and the capacitor are disposed in the mounting area between the mounting frame and the output wiring blocks, wherein the mounting frame has two opposing sidewalls and two protruding ears extend from the two opposing sidewalls respectively, wherein the first moving contact arm and the second moving contact arm are affixed to the respective protruding ears, and wherein the varistor and the capacitor are arranged between the first moving contact arm and the second moving contact arm.

\* \* \* \* \*